(12) United States Patent
Brown et al.

(10) Patent No.: US 10,469,908 B2
(45) Date of Patent: *Nov. 5, 2019

(54) GENERATION OF A MANIFEST INCLUDING A LIST OF LINKS FOR VIDEO SEGMENTS IN LINEAR VIDEO COMMUNICATION

(71) Applicant: HULU, LLC, Santa Monica, CA (US)

(72) Inventors: Stephen Brown, Santa Monica, CA (US); McKay Salisbury, Culver City, CA (US)

(73) Assignee: HULU, LLC, Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/013,751

(22) Filed: Jun. 20, 2018

(65) Prior Publication Data

US 2018/0343498 A1 Nov. 29, 2018

Related U.S. Application Data

(63) Continuation of application No. 15/604,330, filed on May 24, 2017, now Pat. No. 10,015,549.

(51) Int. Cl.
| | |
|---|---|
| *H04N 21/472* | (2011.01) |
| *H04N 21/6405* | (2011.01) |
| *H04N 21/262* | (2011.01) |
| *H04N 21/845* | (2011.01) |
| *H04N 21/854* | (2011.01) |

(52) U.S. Cl.
CPC ..... *H04N 21/472* (2013.01); *H04N 21/26258* (2013.01); *H04N 21/47202* (2013.01); *H04N 21/6405* (2013.01); *H04N 21/8456* (2013.01); *H04N 21/85406* (2013.01)

(58) Field of Classification Search
CPC .......................... H04N 21/472; H04N 21/6405
See application file for complete search history.

(56) References Cited

U.S. PATENT DOCUMENTS

| | | | |
|---|---|---|---|
| 6,216,129 B1* | 4/2001 | Eldering | G06Q 40/06 705/36 R |
| 9,253,229 B1* | 2/2016 | Strothmann | H04N 21/2662 |
| 9,904,925 B2* | 2/2018 | Cristofalo | G06Q 30/00 |
| 2010/0142915 A1* | 6/2010 | McDermott | G11B 27/034 386/343 |
| 2015/0289023 A1* | 10/2015 | Richman | H04N 21/2393 725/32 |

(Continued)

*Primary Examiner* — Sumaiya A Chowdhury
(74) *Attorney, Agent, or Firm* — Fountainhead Law Group P.C.

(57) ABSTRACT

In one embodiment, a method receives a request for a channel offered by a video delivery service from a user and generates user information for the user. In response to receiving the request, the method sends a query to a database to retrieve a bundle that includes an audience definition that matches the user information. A bundle identifies a source stream for a program and only one bundle for a time slot is returned for the query from multiple bundles for the channel that exist for the time slot. A manifest is constructed for the channel using the bundle where the manifest identifies content from the source stream of the bundle. The method then provides portions of the manifest to a client device for the user to allow the client device to request content from the source stream for the channel.

20 Claims, 11 Drawing Sheets

(56) References Cited

U.S. PATENT DOCUMENTS

2016/0189223 A1* 6/2016 McLeod ............ G06Q 30/0257
705/14.55
2016/0189232 A1* 6/2016 Meyer ................ G06Q 30/0267
705/14.58

* cited by examiner

GENERATION OF A MANIFEST INCLUDING A LIST OF LINKS FOR VIDEO SEGMENTS IN LINEAR VIDEO COMMUNICATION

CROSS REFERENCE TO RELATED APPLICATIONS

The present disclosure is a continuation of U.S. patent application Ser. No. 15/604,330, entitled "REAL-TIME GENERATION OF MANIFEST LIST OF LINKS FOR VIDEO SEGMENTS IN LINEAR VIDEO COMMUNICATION", filed May 24, 2017, the contents of which is incorporated herein by reference in its entirety.

BACKGROUND

A television network may show live streams of content. This network may include many different local channels that play different live streams depending on their respective locations. For example, during the same time slot, a first channel may play a first sporting event from teams close to its associated location and a second channel may play a second sporting event from teams close to its, different associated location. This is just one example as there may be multiple different combinations of content for different channels for a single network.

For each local channel, source streams are interwoven together into a single linear stream. The principal operation of networks is that live streams are organized into separate linear streams for each channel and each linear stream is sent separately even if multiple linear streams include the same content. For example, from a time slot of 7:00 p.m.-8:00 p.m., the first channel and the second channel may show the same sports talk show, but from 8:00 p.m.-10:00 p.m., the first channel shows a first sporting event and the second channel shows a second sporting event. This means that the first channel has a first linear stream including the sports talk show and the first sporting event and the second channel has a second linear stream including the sports talk show and the second sporting event. In this case, storage for the first linear stream and the second linear stream are required, which means the sports talk show is stored twice. This is just a simple example and some networks may have a large amount of source streams, which can be interwoven into multiple different combinations. This may require hundreds of interwoven linear streams to be generated. All of these linear streams need to be stored at content distribution networks (CDNs). The CDNs charge for storage and having the large amount of linear streams for every combination stored at the CDN may become a large expense.

DETAILED DESCRIPTION

Described herein are techniques for a video streaming system. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Particular embodiments generate manifests for linear streams for channels in real-time when a client request for a channel is received. A manifest may be a file that lists or includes links for segments of a program on a channel, such as 6-10 second segments of the program. Each channel is associated with a linear stream that includes a number of programs. To be able to generate the manifests for linear streams in real-time, particular embodiments create content bundles that describe each program that could be offered from a source stream. For example, a content bundle includes an audience definition that includes information about a potential user that may be eligible to view the program associated with the content bundle.

When a user sends a request for a channel, the video delivery service uses the content bundles to generate a manifest out of the possible linear streams that are available. The manifest service may compare a viewer definition for the user to the audience definitions of the content bundles to determine which programs should be interweaved into the linear stream. In one embodiment, one channel can have more than one program available at a given point in time; however, for a given viewer definition, the audience definitions of the content bundles are configured such that there is only one available playable program. The video delivery service determines a series of the content bundles for one or more time slots for the user and generates the manifest for the linear stream.

The manifest includes one or more links for segments of programs that a client can use to retrieve the programs from a content delivery network. Portions of the manifest (e.g., one or more links for segments of video) may then be provided to the client and the client can then request the portions of the programs from the content delivery network. The content delivery network can then respond with the appropriate source streams based on the links. Because the video delivery service uses the manifest to stitch the source streams together into a single linear stream, the content delivery network only needs to store the source streams and not the full set of combinations of interwoven linear streams. This saves storage and also cost.

Overview

Figure 1:
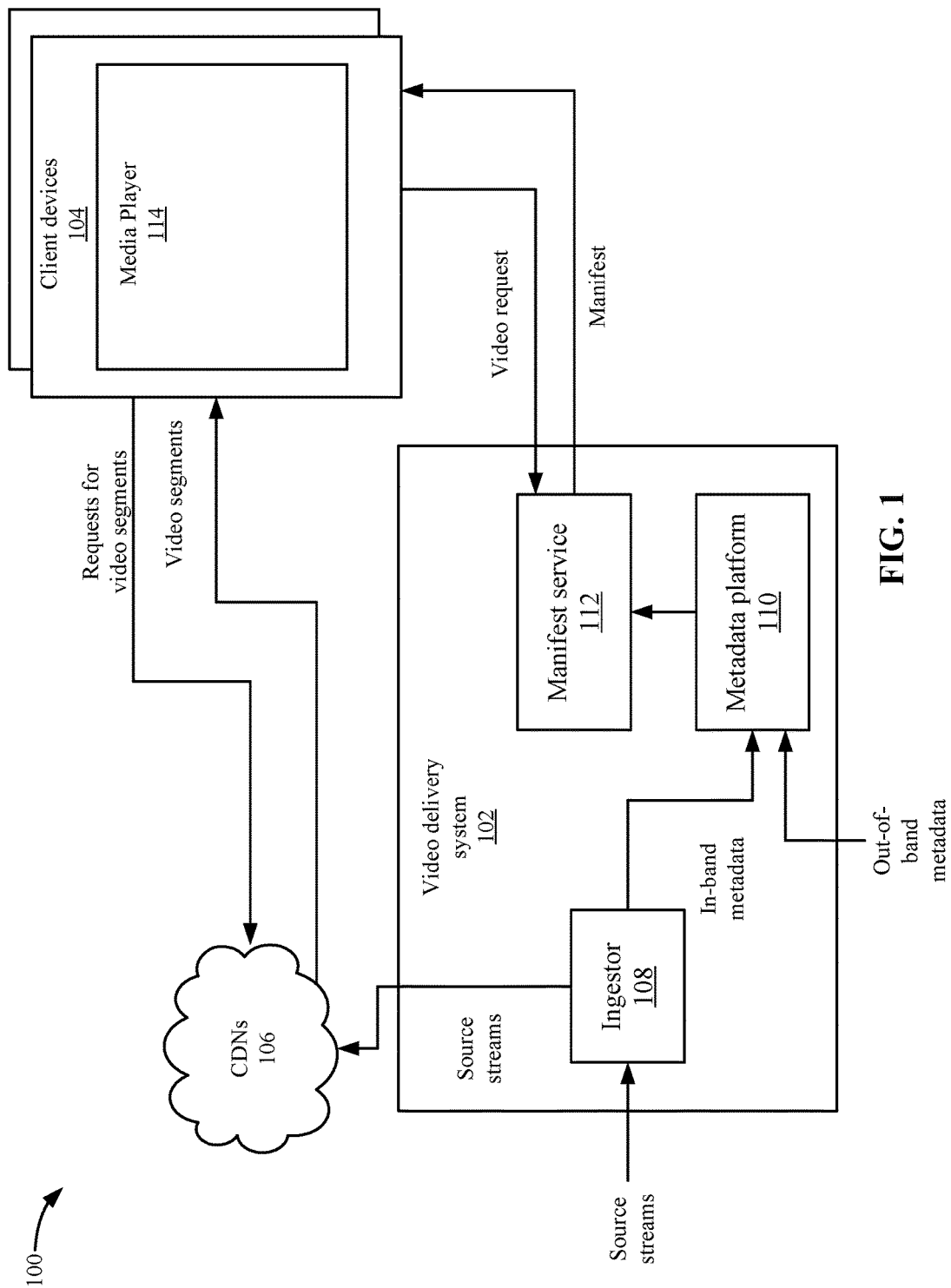
FIG. 1 depicts a simplified system for providing content to client devices according to one embodiment.

FIG. 1 depicts a simplified system 100 for providing content to client devices 104 according to one embodiment.

System 100 includes a video delivery system 102 that manages the delivery of content to client devices 104 via content delivery networks (CDNs) 106. Video delivery system 102 receives source streams for source content from a content provider. The source streams may include video or other content (e.g., audio). The content may be live or recorded. For example, live content may be from a live event occurring in real-time. A recorded event may be content from a television show or other content that was recorded previously. Video delivery system 102 may receive source streams for multiple channels where a channel may be offered by a network and a video delivery service allows users of the service to request the channel using the service. For example, a user may request a channel #X using the video delivery service.

In one example, a network may include multiple channels that may show different programs based on different characteristics, such as location. For example, the network may have local or regional channels where different locations may offer different programs at the same time. In one example, a regional sports channel in a location #1 plays a first sporting event broadcast and a regional sports channel in a location #2 plays a second sporting event broadcast at the same time. Video delivery system 102 may receive two source streams for the two sporting event broadcasts.

The above example only used two programs; however, as discussed above, there may be a large amount of source streams that are received for the channels. Each channel may have different linear combinations of source streams. As discussed in the Background, from a time slot of 7:00 p.m.-8:00 p.m., the first channel and the second channel may show the same sports talk show, but from 8:00 p.m.-10:00 p.m., the first channel shows a first sporting event and the second channel shows a second sporting event. Additionally, it is possible that one channel may have different programs available at the same time, such as different programs for a user using a mobile device and a web device. When the different combinations of source streams are interwoven over time, this results in a large amount of linear streams. Further, the video delivery service may be a video streaming service that allows users to access the service using multiple devices and in different locations. This may create additional combinations as the video delivery service may delivery different programs to different devices. This may be different from cable systems where delivery is fixed to a user's home.

The video delivery service may use CDNs 106 to deliver the channels to users. The video delivery service may offer both on-demand programming and live programming. CDNs 106 are used to delivery both types of programming. This may be different from cable networks that are not charged for storage and can store each separate linear stream because the cable systems have a fixed cable network to a user's home. However, the video delivery service needs to pay for the content stored at CDNs 106, which may be separate entities from the video delivery service. To mitigate the cost, particular embodiments only store the source streams at CDNs 106. For example, an ingester 108 receives the source streams and can provide the source streams to different content delivery networks 106 for storage. Ingester 108 does not combine the source streams into different linear streams that are provided for storage in CDNs 106. By only storing the source streams at CDNs 106, video delivery system 102 saves both storage and expense at CDNs 106.

Because the linear streams for the different combinations of source streams are not stored in CDNs 106, video delivery system 102 generates content bundles that are then used to create manifests in real-time for linear streams for users. To generate the content bundles, video delivery system 102 uses a metadata platform 110 that can retrieve metadata for the programs on every source stream. For example, metadata platform 110 may receive out-of-band metadata from external sources and also in-band metadata from the source streams that are received at ingester 108. The metadata may include information for each program that may include the start time, end time, and the source stream. Electronic program guide (EPG) information may be an example of out-of-band metadata. Also, the in-band metadata from ingester 108 may include metadata included in the source stream, such as blackout information for sporting events.

Metadata platform 110 builds an audience definition that defines characteristics that can be used to determine which users can view the respective program from the metadata. For example, the audience definition may include geolocation, purchased package from the video delivery service, client device type, and start and end times of the program. The audience definition may define characteristics that can be used to determine the audience that can view the respective programs. For example, if a user that requests a channel has characteristics that match the audience definition, then video delivery system 102 can determine that the user should be provided the program associated with the content bundle for that audience definition.

One channel may have more than one program available at a given point in time. In this case, metadata platform 110 creates multiple content bundles for the same point in time. However, the content bundles at the same point in time are configured to have different audience definitions. That is, the audience definitions are generated such that for any given audience definition, there is only one available playable program. Because video delivery system 102 does not store each linear stream that can be requested by client devices 104 at content delivery networks 106, a manifest service 112 is used to generate a manifest from content bundles where the manifest describes the content to be requested from source streams to provide the linear stream. Manifest service 112 may access content bundles from metadata platform 110 and select content bundles that match a viewer definition, which includes geolocation of the client device requesting the content, a package purchased by the user, a time requested, and a client device type used to make the request. That is, the viewer definition includes characteristics for the specific user requesting the channel whereas the audience definition included characteristics that are used to match to the viewer definition. For example, manifest service 112 may match a viewer definition received from a user of client device 104 to an audience definition for content bundles. Manifest service 112 can then generate the manifest for the linear stream from the series of content bundles.

To allow client device 104 to playback programs from the channel on a media player 114, manifest service 112 can then provide portions of the manifest to client device 104. For example, the manifest may include links for segments of the program, such as 6-10 second segments. During a live broadcast, the portion of the manifest that is known is the current segment of the program to be played. The link to this segment can be provided to client device 104. This process continues as the live program is received at the video delivery service and different links are provided to client device 104.

Using the content bundles to generate the manifest in real-time allows video delivery system 102 to adjust the linear stream in real-time. For example, video delivery system 102 can allow for real-time program blackout based on in-band metadata updates from ingester 108. Further, as discussed above, the use of content bundles and the real-time generation of the manifest allows only source streams to be stored at CDNs 106 instead of the different combinations of linear streams that could be requested.

Content Bundle Generation

Figure 2:
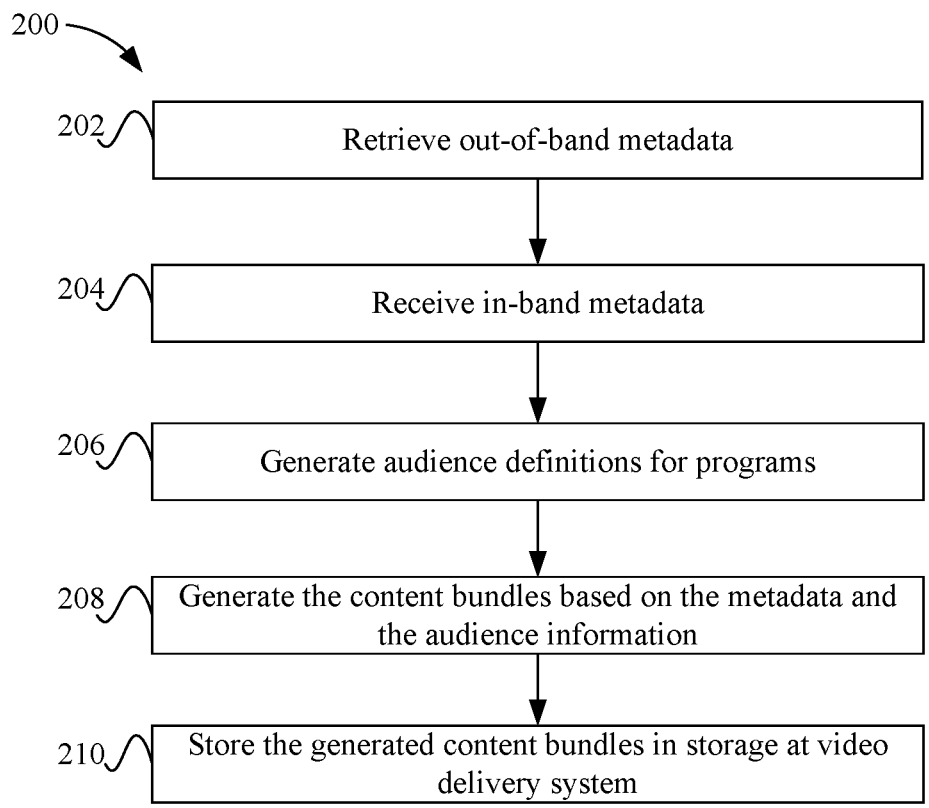
FIG. 2 depicts a simplified flowchart of a method for generating content bundles according to one embodiment.

FIG. 2 depicts a simplified flowchart 200 of a method for generating content bundles according to one embodiment. At 202, metadata platform 110 retrieves out-of-band metadata. The out-of-band metadata may be retrieved from external sources, such as metadata services, channel websites, electronic program guides, etc. The external metadata may list the programs that are available on each channel and in what time slot.

At 204, metadata platform 110 receives in-band metadata. The in-band metadata may be received in association with source streams that are received at ingester 108. The in-band metadata may be real-time metadata, such as blackout information for the content.

At 206, metadata platform 110 generates audience definitions for programs. The audience definition may be generated based on the metadata and information from the video delivery service, or from third party information.

At 208, metadata platform 110 generates the content bundles based on the metadata and the audience information. Metadata platform 110 may first determine a time slot for the channel and then the different programs that are available during that time slot based on the metadata. Then, metadata platform 110 creates a content bundle for each program that is available where the audience definition is different for each program. Metadata platform 110 creates the content bundles for each possible time slot from the metadata.

At 210, metadata platform 110 stores the generated content bundles in storage at video delivery system 102. The content bundles use a lot less storage compared with storing all the different combinations of linear streams at CDNs 106. This allows the video delivery service to more efficiently use storage and reduce costs.

Figure 3A:
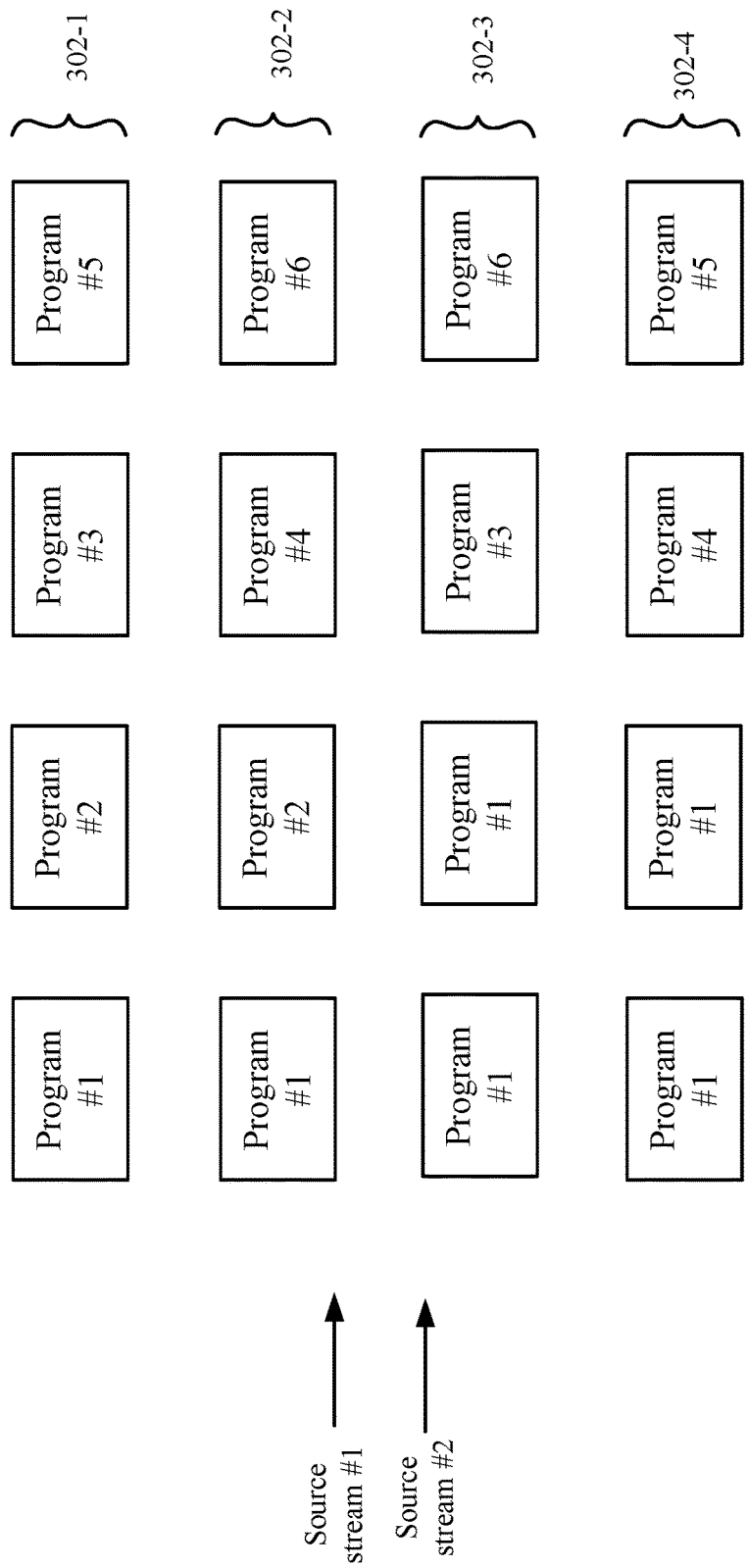
FIG. 3A shows four linear streams that are possible for a channel according to one embodiment.

FIG. 3A shows four linear streams that are possible for a channel according to one embodiment. In one example, different content may be offered in different time slots. For a time slot from 7 p.m.-8 p.m., only one program may be available of program #1. Similarly, for a time slot from 8 p.m.-9 p.m., a program #2 may only be available. However, in the time slot 9:00 p.m.-10:00 p.m., a program #3 is available and a program #4 is available. Also, in a time slot 10:00 p.m.-11:00 p.m., a program #5 and a program #6 are available. The different combinations that are possible result in four linear streams 302-1-302-4. However, it is noted that more granular requirements (e.g., different programs for mobile and web devices) may make more combinations possible than what is shown. Also, as more programs become available, the number of linear streams increases even more, such as a program #7 being available in the time slot from 10:00 p.m. to 11:00 p.m. will increase the number of linear streams from at least four to eight. When the video delivery service is offering a large amount of programs, the number of possible linear streams can become very large.

Although there are four linear streams 302 and six programs, the six programs may be provided in two source streams #1 and #2. Accordingly, ingester 108 may provide two source streams to CDNs 106 for storage. If the manifest was not being used, four linear streams would have to be stored at CDNs 106. This means four instances of program #1, and four instances of program #2, and two instances of programs #3, #4, #5, and #6 will be stored. That is, for each linear stream, an instance of each program in the stream needs to be stored because the linear stream is a continuous stream that is sent for a specific channel. Thus, the same program is stored multiple times.

Figure 3B:
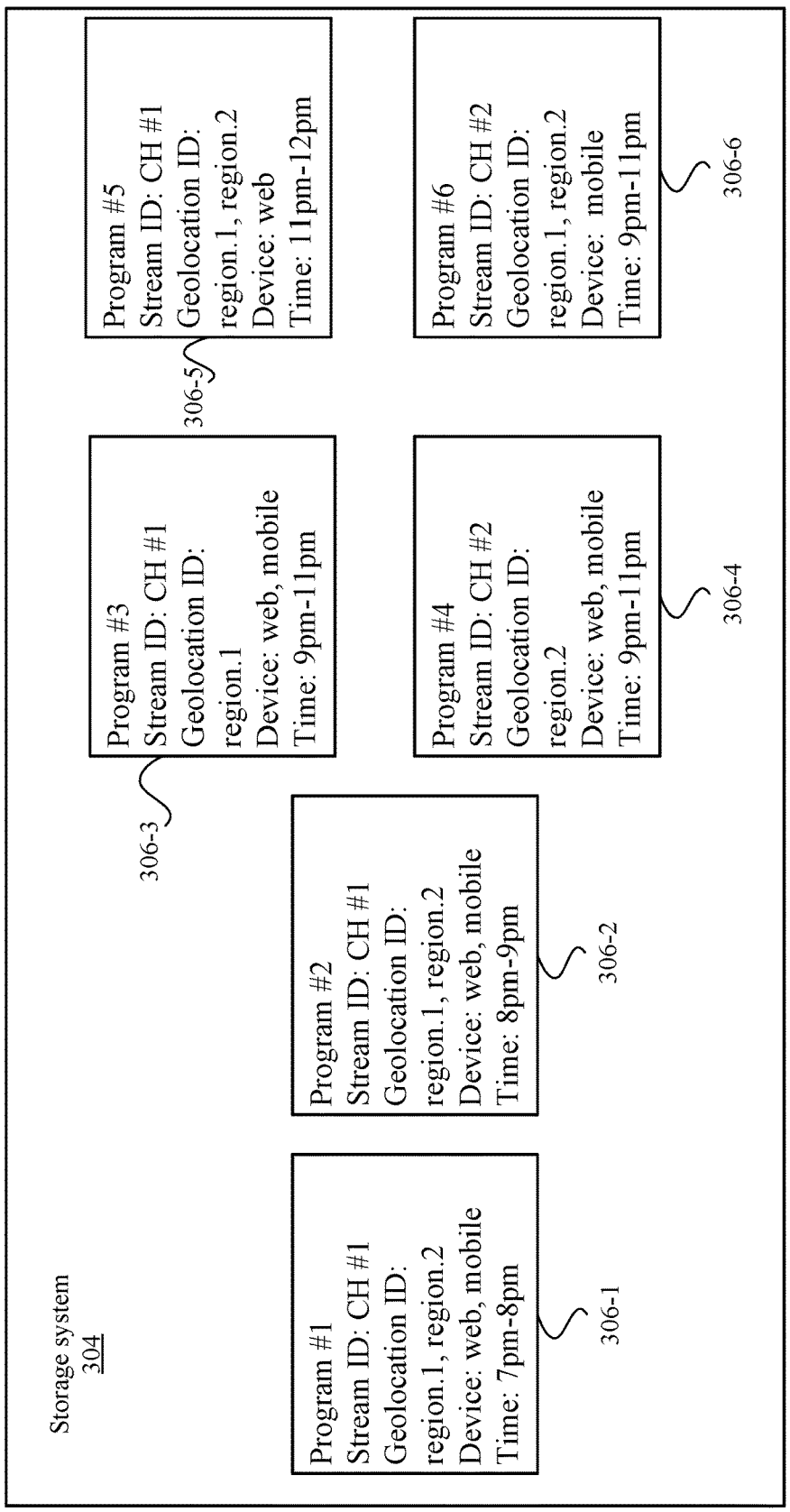
FIG. 3B shows an example of content bundles that are stored in storage according to one embodiment.

FIG. 3B shows an example of content bundles that are stored in storage system 304 according to one embodiment. At 306-1, a content bundle for program #1 is shown. Content bundle 306-1 includes an audience definition including the geolocation ID, client device type, and start and end time. Also, the content bundle includes program information that describes the program, such as a stream identifier (ID) for the source stream. The stream ID identifies the source stream of channel (CH) #1. The audience definition also describes information about a potential user, such as the geolocation ID, device that are required to view this program, and the time slot. The geolocation is a geographical location where the potential user is located. In this case, two regions of "region.1" and "region.2" represent two different locations where this program is shown. The device is any type of device that the potential user can use to access the program. In this case, the program can be accessed by a web client or mobile client, but other devices could be used, such as living room devices. The time slot of 7:00 p.m.-8:00 p.m. is when the program is to be offered in the linear stream. Other information for the audience definition may also be included, such as another device type may be living room, and other geographical areas may be included.

A content bundle 306-2 is provided for program #2 and includes an audience definition 308-2 that contains similar information compared with content bundle 306-1. The program may be different in this case however, but it is the same source stream of channel #1. That is, the source stream for channel #1 includes program #1 from 7:00 p.m.-8:00 p.m. and then program #2 from 8:00 p.m.-9:00 p.m.

Content bundle 306-3 for program #3 and content bundle 306-4 for program #4 are scheduled for the same time slot of 9:00 p.m.-11:00 p.m. In one embodiment, program #3 may be a first live sporting event and program #4 may be a second live sporting event. The audience definition indicates a geolocation ID of region.1, which may be in a first location. At 308-4 in content bundle 306-4, the audience definition lists the geolocation ID as a second region of region.2, which is a second location that is different from the first location. For example, program #3 and program #4 may be available in different locations corresponding to the respective geolocation IDs. The device types are the same, but that does not need to be the case. Also, the programs are included on different source streams for different channels. For example, program #3 is included in the source stream for channel #1 and program #4 is included in the source stream for channel #2.

Content bundle 306-5 is for program #5 and content bundle 306-6 is for program #6. In this case, the audience definition defines program #5 for web devices and the audience definition for content bundle 306-6 defines program #6 for mobile devices. This means that if the user is using a web device, the user receives program #5 and if the user is using a mobile device, the user receives program #6. Further, both content bundles define the region as region.1 or region.2. This means it is possible that users in the same region that are using different devices will receive different programs. Also, the programs are included on different source streams for different channels. For example, program #5 is included in the source stream for channel #1 and program #6 is included in the source stream for channel #2.

Manifest Generation

Figure 4:
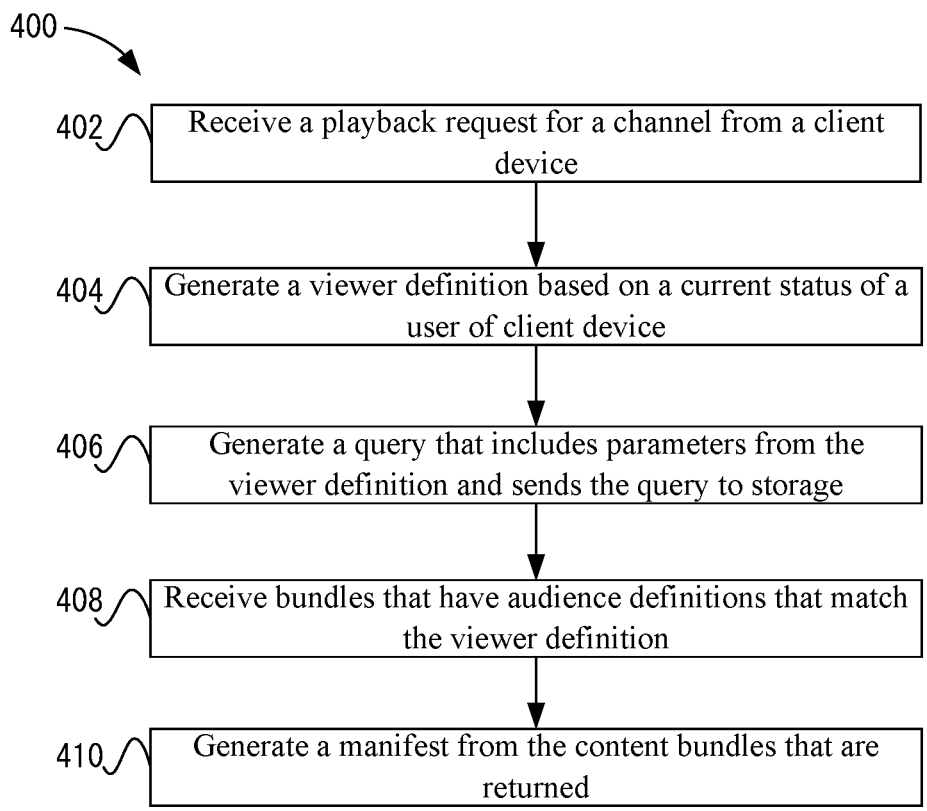
FIG. 4 depicts a simplified flowchart of a method for generating manifests according to one embodiment.

Once the content bundles 306 are generated in storage system 304, manifest service 112 can use the content bundles to generate manifests. FIG. 4 depicts a simplified flowchart 400 of a method for generating manifests according to one embodiment. At 402, manifest service 112 receives a playback request for a channel from a client device 104. For example, the playback request may request channel #X that is offered by the video delivery service. The request may also include information about the user, such as the user's location (e.g., billing location and/or geolocation of where the client device is currently located), the packages purchased by the user, and the device type of client device 104.

At 404, manifest service 112 generates a viewer definition based on a current status of a user of client device 104. The viewer definition may define characteristics of the viewer. For example, the viewer definition may include a stream ID, geolocation ID, a device, and time that are determined from the request. The stream ID is the channel of the video delivery service that is selected by the user, the geolocation ID is the current location of the user, the device is the type of device currently being used by the user, and the time may be the time of the request, the current time, or a time slot. It is noted that the channel identifier used by the video delivery service may be different from the source stream identifier. However, it is assumed the stream ID can be used to identify the source stream. For example, a mapping may be used to map from video delivery service channel to source stream. The viewer definition may also include the user's billing location, purchased packages, and previously-viewed content. Different parts of the viewer definition may be used based on what channel is being requested. For example, national networks may use the user's current location to determine playback rights, cable networks (e.g., regional networks, cable channels) may use billing location for geo-restrictions, and other channels, such as premium channels, would not be available for users that did not purchase the package that includes the premium channel.

At 406, manifest service 112 generates a query that includes parameters from the viewer definition and sends the query to storage system 304. The query may be generated based on information in the viewer definition, such as a stream ID, geolocation ID, device, and time (e.g., a current time or time slot). Storage system 304 then processes the queries to select content bundles 306 that match the parameters of the query. As mentioned above, for a given time, only one content bundle 306 would make the query.

At 408, manifest service 112 receives content bundles 306 that have audience definitions that match the viewer definition. In one embodiment, manifest service 112 can receive a content bundle for exactly the current moment in time. In another embodiment, manifest service 112 can receive content bundles 306 for a time range, such as multiple hours, or a day, or a time slot of an hour or two.

At 410, manifest service 112 generates a manifest from the content bundles 306 that are returned. If only the current bundle 306 at the current moment in time is retrieved, client device 104 would have to continue to watch the same channel and manifest service 112 would continue to retrieve content bundles 306 as the time changes to another time slot. The manifest includes one or more links for segments (e.g., six to ten seconds of content) of the program. The links retrieve segments of the source streams for the program from source streams stored at content delivery network 106.

Figure 5A:
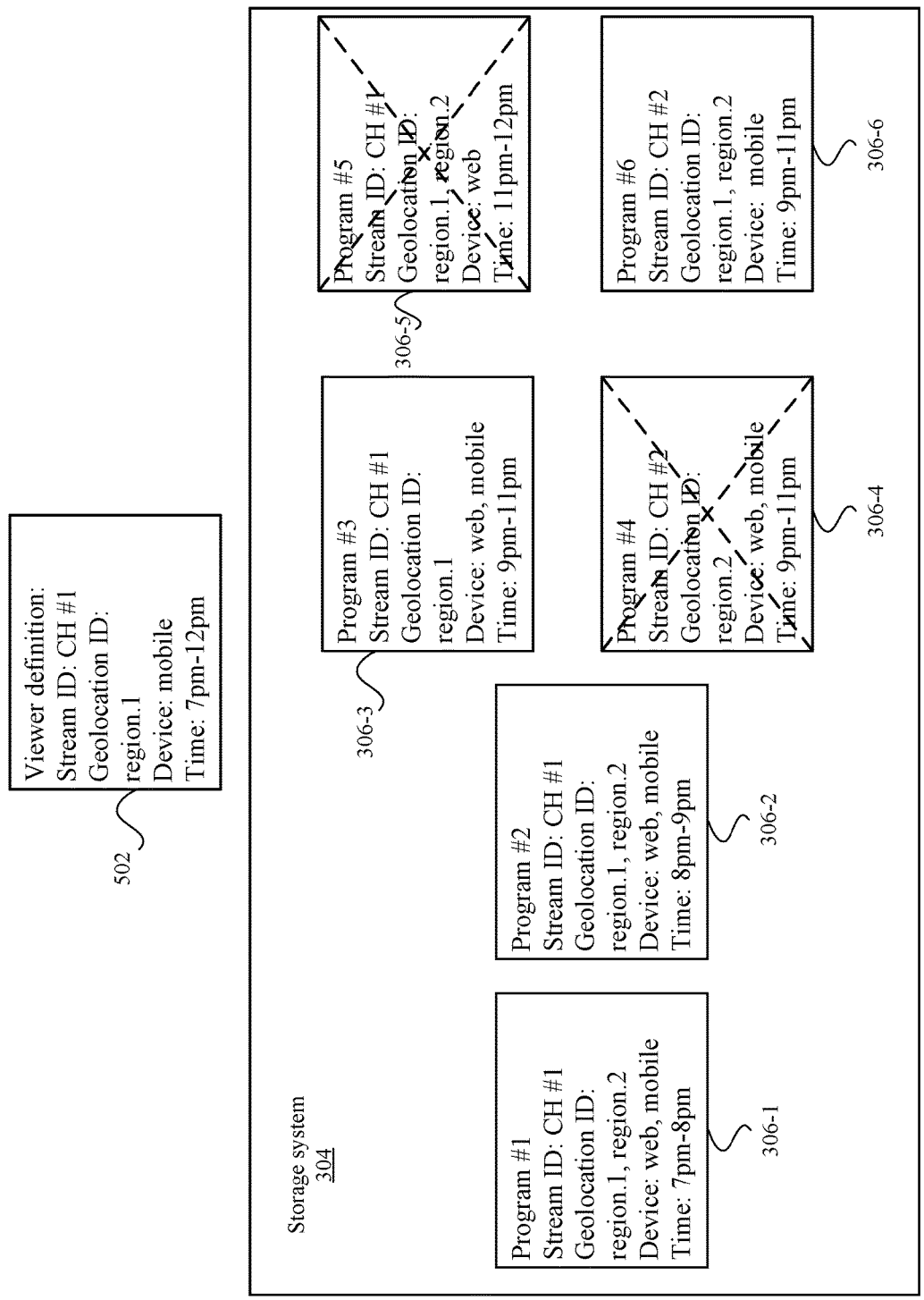
FIG. 5A shows an example of selecting content bundles according to one embodiment.

FIG. 5A shows an example of selecting content bundles 306 according to one embodiment. At 502, a viewer definition is shown. This viewer definition may be generated based on user characteristics from a user that requested a channel on the video delivery service. The viewer definition includes a stream ID of channel #1, a geolocation ID of region.1, a device of mobile, and a time of 7:00-11:00 p.m. In order to display the current program and future programs that are available for a user, the content bundles 306 for the current time slot and future time slots for the channel may be used to display the current program and future programs that are available for a user, such as in a guide. Also, the current and/or future programs may be used to generate recommendations for the user. During playback, the content bundles 306 are used to generate the manifest and switch between programs.

Storage system 304 shows the possible content bundles 306 from FIG. 3B. Storage system 304 uses the viewer definition to select content bundles 306. For the time slots of 7:00 p.m.-8:00 p.m. and 8:00 p.m.-9:00 p.m., there is only one program available, respectively, and content bundle 306-1 is selected for the 7:00 p.m. time slot and content bundle 306-2 is selected for the time slot 8:00 p.m.-9:00 p.m. For time slot 9:00 p.m.-11:00 p.m., bundle 306-3 and bundle 306-4 are available. Storage system 304 determines that content bundle 306-3 matches the viewer definition and content bundle 306-4 does not match the viewer definition. This is because the geolocation ID of viewer definition 502 is region.1, which matches the geolocation ID for content bundle 306-3 of region.1 and not the geolocation ID of content bundle 306-4 of region.2. Accordingly, content bundle 306-3 is selected.

For the time slot 11:00 p.m.-12:00 a.m., content bundles 306-5 and 306-6 are available. Storage system 304 selects content bundle 306-6 because the device the user is using is a mobile device, which matches the device in viewer definition 502. Content bundle 306-5 is associated with a web device and not selected.

Figure 5B:
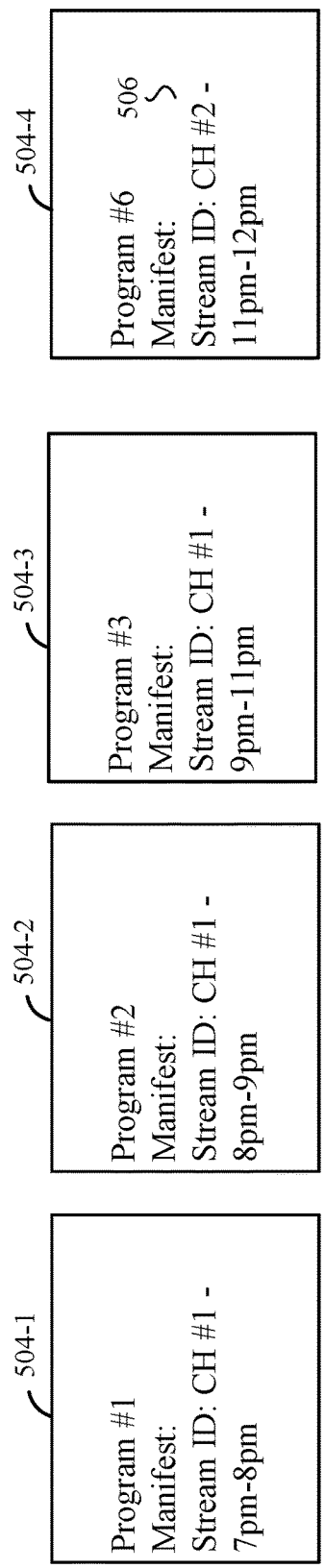
FIG. 5B shows an example of manifests that are generated for a linear stream based on the selected content bundles according to one embodiment.

FIG. 5B shows an example of manifests that are generated for a linear stream based on the selected content bundles 306 according to one embodiment. At 504-1, a manifest for program #1 is provided. The manifest served is for stream ID channel #1 from 7:00 p.m.-8:00 p.m. and the stream is from a source stream #1. Although not shown, this includes links to segments of content for channel #1. Similarly, at 504-2, a manifest for program #2 is shown. The manifest served is for channel #1 from 8:00 p.m.-9:00 p.m. At 504-3, the manifest for program #3 is shown. The manifest served is for channel #1 from 9:00 p.m.-11:00 p.m.

At 504-4, the manifest for program #6 is shown. As shown at 506, the manifests served are for channel #2 for a source stream #2 from 9:00 p.m.-11:00 p.m. Source stream #1 is not shown during this time slot.

Playback

Figure 6A:
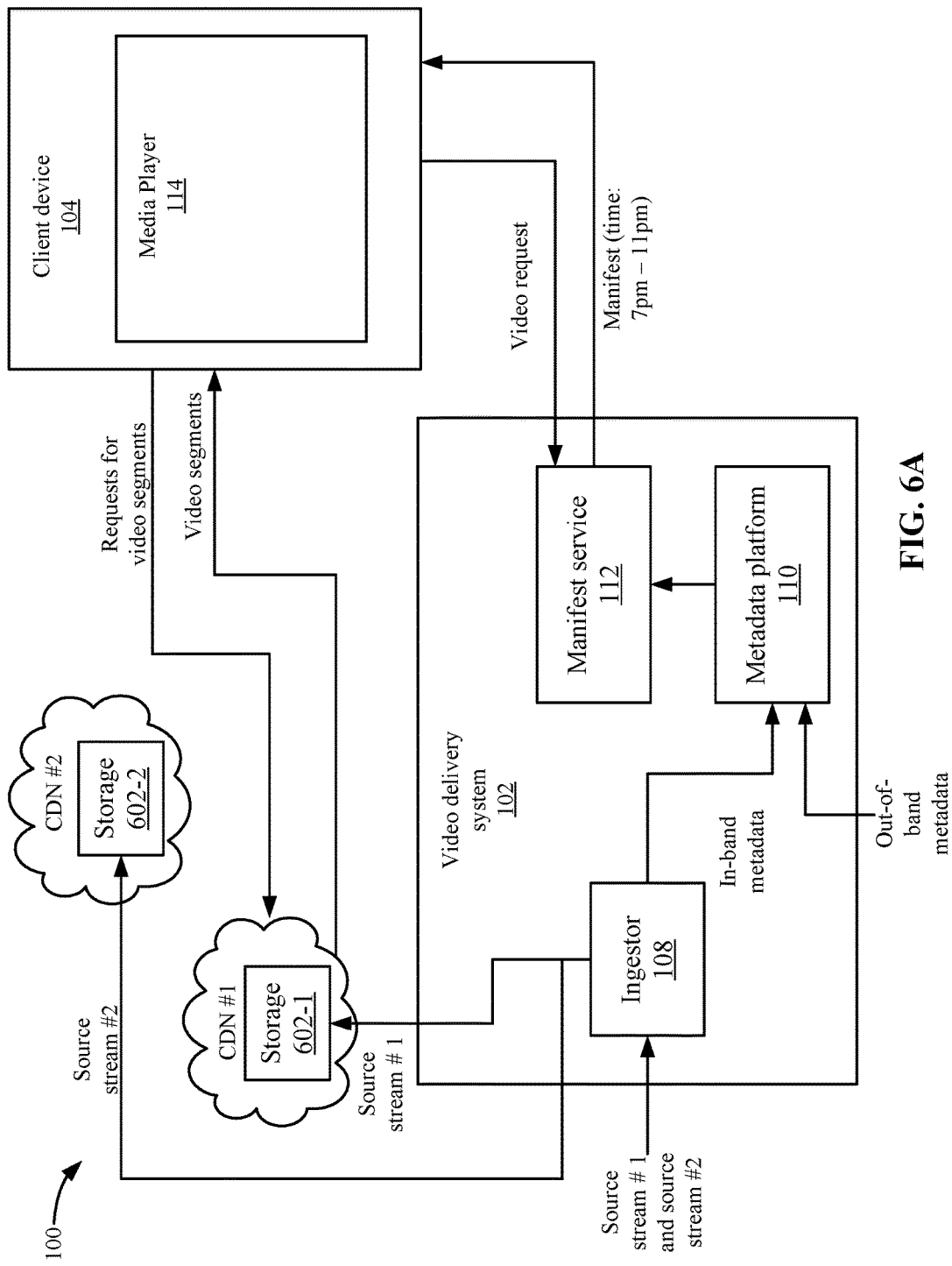
FIG. 6A depicts an example of using a manifest for a first time slot according to one embodiment.

Client device 104 may receive manifests from manifest service 112 and use the manifests to request content. When a live program is requested, portions of the manifest may be sent in real-time as the live program is received. That is, one or more links for a current segment (or segments) of the live program is received and sent to client device 104. For on-demand programs, the entire manifest for the program may be sent at once. Based on a single request for a channel, client device 104 may receive manifests for different source streams based on a user's viewer definition. FIG. 6A depicts an example of using a manifest for a first time slot according to one embodiment. Ingester 108 receives source stream #1 and source stream #2 and can distribute the source streams to applicable CDNs 106. For example, a first CDN #1 may be in a first location, such as region #1, and a second CDN #2 may be in a second location, such as region #2. Ingester 108 may send a source stream #1 to CDN #1 and source stream #2 to CDN #2. CDN #1 may store source stream #1 in storage 602-1 and CDN #2 may store source stream #2 in storage 602-2. It is noted that linear combinations of the source streams are not stored in storage 602-1 or 602-2. Further, source stream #1 and source stream #2 do not need to be stored at both CDNs even though it is possible that a linear stream would include programs from both source streams because the manifest that was generated is used to switch between source streams as will be described below.

Manifest service 112 may then serve a manifest to client device 104. The manifest may be for a certain time period, such as for a one-hour time slot. Each manifest may include links to a portion of content. For example, a link may request a 10-second segment of content from a CDN and stream ID combination at time slots from 7:00 p.m.-8:00 p.m., 8:00 p.m.-9:00 p.m., and 9:00 p.m.-11:00 p.m. The manifest provided to client device 104 includes links to CDN #1 and source stream #1. Client device 104 uses those links to request the content from stream #1 from CDN #1. CDN #1 then sends the segments from stream #1 to client device 104, which can then play the segments of content from stream #1 in a media player 112.

Figure 6B:
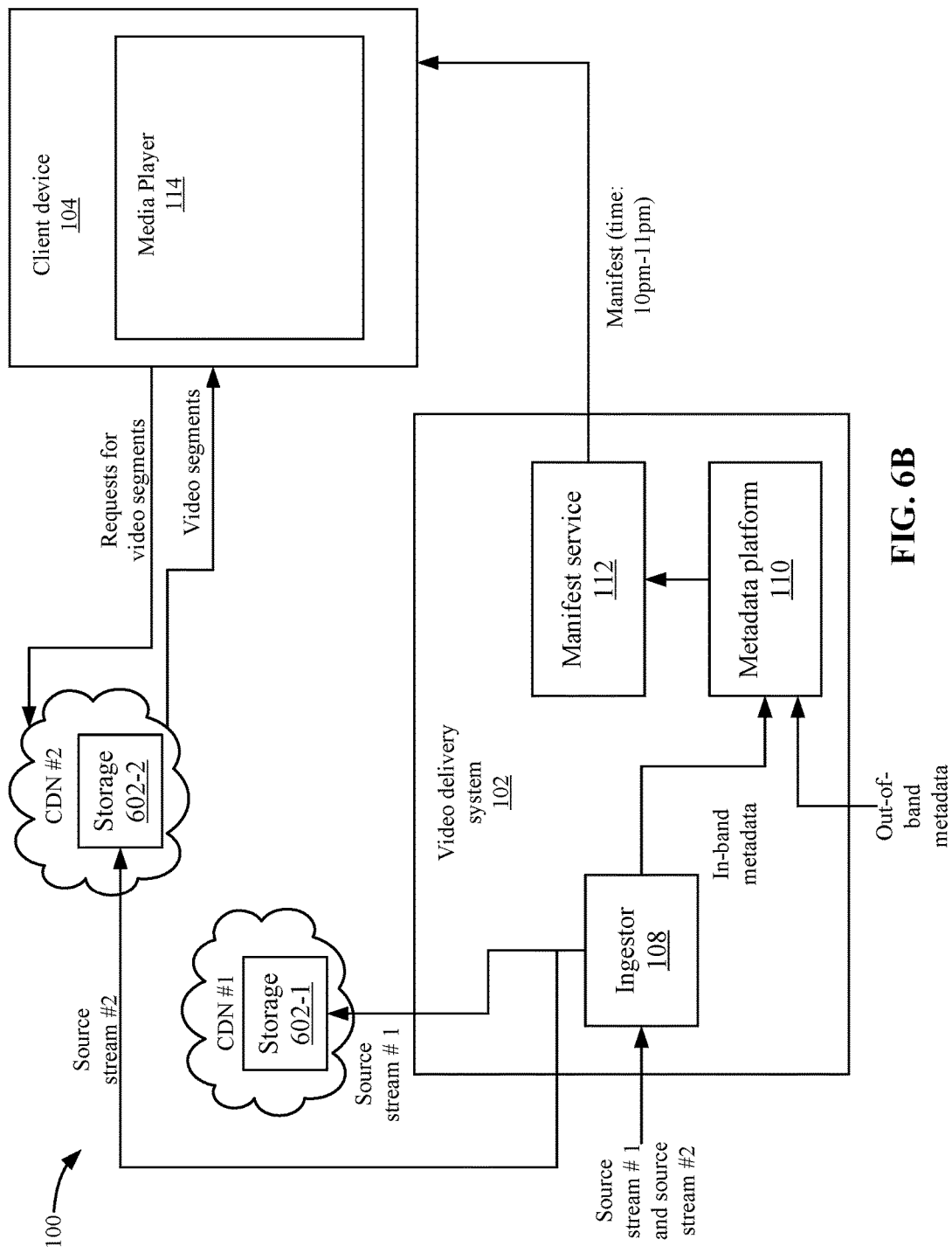
FIG. 6B shows an example of using a manifest in a second time slot according to one embodiment.

FIG. 6B shows an example of using a manifest in a second time slot according to one embodiment. Manifest service 112 may send a manifest based on bundle 504-4 during the time slot 11:00 p.m.-12:00 a.m. This manifest includes links to CDN #2 and source stream #2. Client device 104 then uses the links to request segments of source stream #2 from CDN #2. Although two different CDNs are used to store two different source streams, the same CDN may be used to store the different source streams. This effectively switches the source stream being requested from source stream #1 to source stream #2 automatically. Further, client device 104 is now requesting a source stream from a different CDN although it is noted that the same CDN may also be used, but just a different source stream.

The switching of source streams and/or CDNs may be performed automatically without a request from client device 104. That is, manifest service 112 determines the switch based on bundles 306 and not a request from client device 104. Using this method, manifest service 112 can perform switches at any time, such as minute-by-minute or segment-by-segment, based on content bundles 306. This may allow manifest service 112 to honor a real-time blackout of a source stream by switching manifests. However, client device 104 thinks it is requesting a single linear stream, but in reality using manifest service 112, client device 104 can request different source streams. From the user's perspective, the user views a linear stream on a channel even though programs from different source streams may be sent to the user. The abstraction of the source streams into content bundles 306 allows the switching among source streams. Further, the storage of interwoven linear streams that include all the required combinations of programs is also avoided and duplication of source streams at multiple CDNs is avoided.

System

Figure 7:
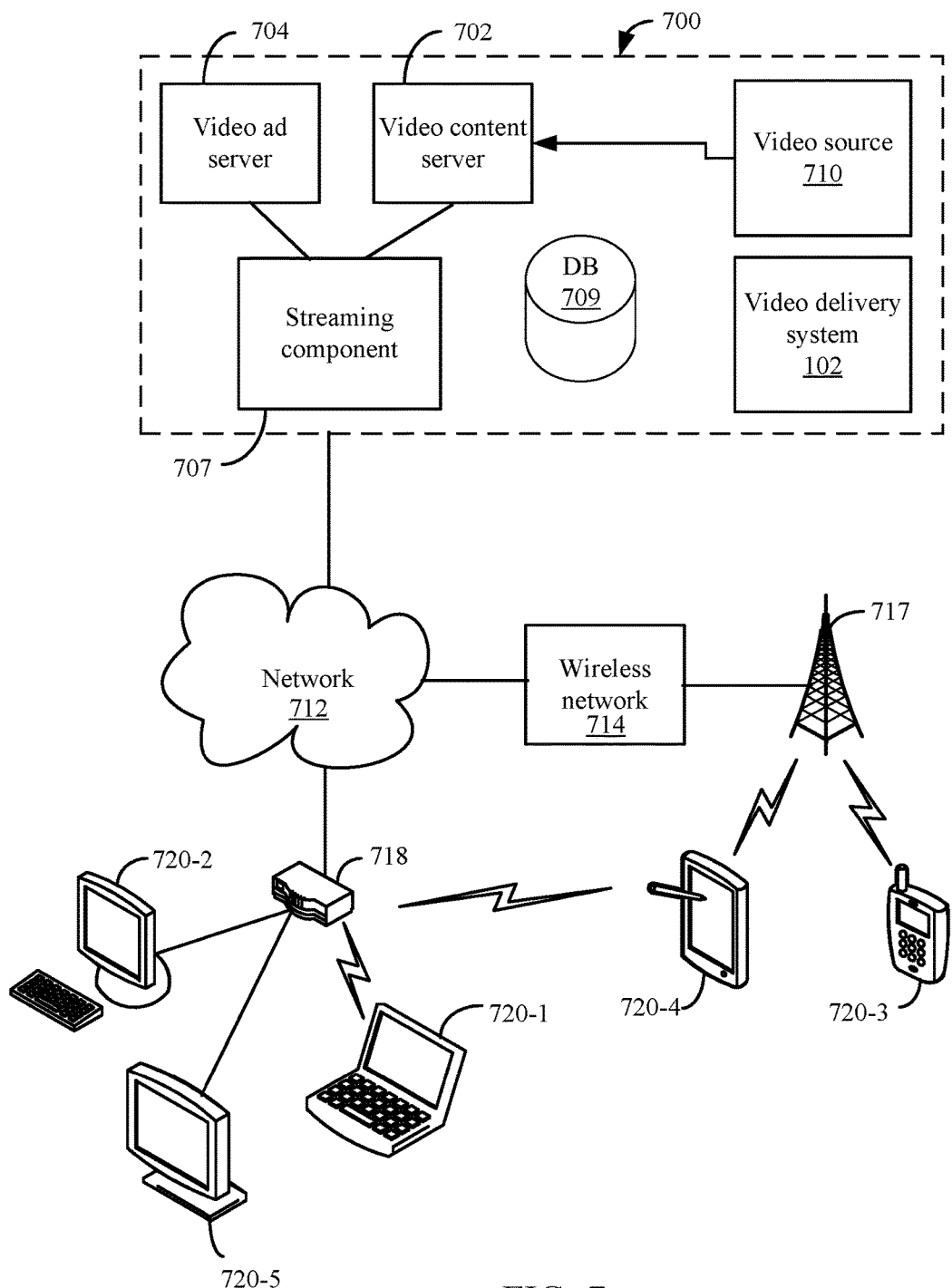
FIG. 7 depicts a video streaming system in communication with multiple client devices via one or more communication networks according to one embodiment.

Features and aspects as disclosed herein may be implemented in conjunction with a video streaming system 700 in communication with multiple client devices via one or more communication networks as shown in FIG. 7. Aspects of the video streaming system 700 are described merely to provide an example of an application for enabling distribution and delivery of content prepared according to the present disclosure. It should be appreciated that the present technology is not limited to streaming video applications, and may be adapted for other applications and delivery mechanisms.

In one embodiment, a media program provider may include a library of media programs. For example, the media programs may be aggregated and provided through a site (e.g., Website), application, or browser. A user can access the media program provider's site or application and request media programs. The user may be limited to requesting only media programs offered by the media program provider.

In system 700, video data may be obtained from one or more sources for example, from a video source 710, for use as input to a video content server 702. The input video data may comprise raw or edited frame-based video data in any suitable digital format, for example, Moving Pictures Experts Group (MPEG)-1, MPEG-2, MPEG-4, VC-1, H.264/Advanced Video Coding (AVC), High Efficiency Video Coding (HEVC), or other format. In an alternative, a video may be provided in a non-digital format and converted to digital format using a scanner and/or transcoder. The input video data may comprise video clips or programs of various types, for example, television episodes, motion pictures, and other content produced as primary content of interest to consumers. The video data may also include audio or only audio may be used.

The video streaming system 700 may include one or more computer servers or modules 702, 704, and/or 707 distributed over one or more computers. Each server 702, 704, 707 may include, or may be operatively coupled to, one or more data stores 709, for example databases, indexes, files, or other data structures. A video content server 702 may access a data store (not shown) of various video segments. The video content server 702 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 704 may access a data store of relatively short videos (e.g., 10 second, 30 second, or 60 second video advertisements) configured as advertising for a particular advertiser or message. The advertising may be provided for an advertiser in exchange for payment of some kind, or may comprise a promotional message for the system 700, a public service message, or some other information. The video advertising server 704 may serve the video advertising segments as directed by a user interface controller (not shown).

The video streaming system 700 also may include video delivery system 102.

The video streaming system 700 may further include an integration and streaming component 707 that integrates video content and video advertising into a streaming video segment. For example, streaming component 707 may be a content server or streaming media server. A controller (not shown) may determine the selection or configuration of advertising in the streaming video based on any suitable algorithm or process. The video streaming system 700 may include other modules or units not depicted in FIG. 7, for example administrative servers, commerce servers, network infrastructure, advertising selection engines, and so forth.

The video streaming system 700 may connect to a data communication network 712. A data communication network 712 may comprise a local area network (LAN), a wide area network (WAN), for example, the Internet, a telephone network, a wireless cellular telecommunications network (WCS) 714, or some combination of these or similar networks.

One or more client devices 720 may be in communication with the video streaming system 700, via the data communication network 712 and/or other network 714. Such client devices may include, for example, one or more laptop computers 720-1, desktop computers 720-2, "smart" mobile phones 720-3, tablet devices 720-4, network-enabled televisions 720-5, or combinations thereof, via a router 718 for a LAN, via a base station 717 for a wireless telephony network 714, or via some other connection. In operation, such client devices 720 may send and receive data or instructions to the system 700, in response to user input received from user input devices or other input. In response, the system 700 may serve video segments and metadata from the data store 709 responsive to selection of media programs to the client devices 720. Client devices 720 may output the video content from the streaming video segment in a media player using a display screen, projector, or other video output device, and receive user input for interacting with the video content.

Distribution of audio-video data may be implemented from streaming component 707 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidths and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player on the destination client. Streaming component 707 may communicate with client device 720 using control messages and data messages to adjust to changing network conditions as the video is played. These control messages can include commands for enabling control functions such as fast forward, fast reverse, pausing, or seeking to a particular part of the file at the client.

Since streaming component 707 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched, (3) use transmission bandwidth more efficiently, since only the amount of data required to support the viewing experience is transmitted, and (4) the video file is not stored in the viewer's computer, but discarded by the media player, thus allowing more control over the content.

Streaming component 707 may use TCP-based protocols, such as HTTP and Real-time Messaging Protocol (RTMP). Streaming component 707 can also deliver live webcasts and can multicast, which allows more than one client to tune into a single stream, thus saving bandwidth. Streaming media players may not rely on buffering the whole video to provide random access to any point in the media program. Instead, this is accomplished through the use of control messages transmitted from the media player to the streaming media server. Another protocol used for streaming is hypertext transfer protocol (HTTP) live streaming (HLS) or Dynamic Adaptive Streaming over HTTP (DASH). The HLS or DASH protocol delivers video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and also infrastructure failures that may occur during playback of the video.

The delivery of video content by streaming may be accomplished under a variety of models. In one model, the user pays for the viewing of video programs, for example, using a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Figure 8:
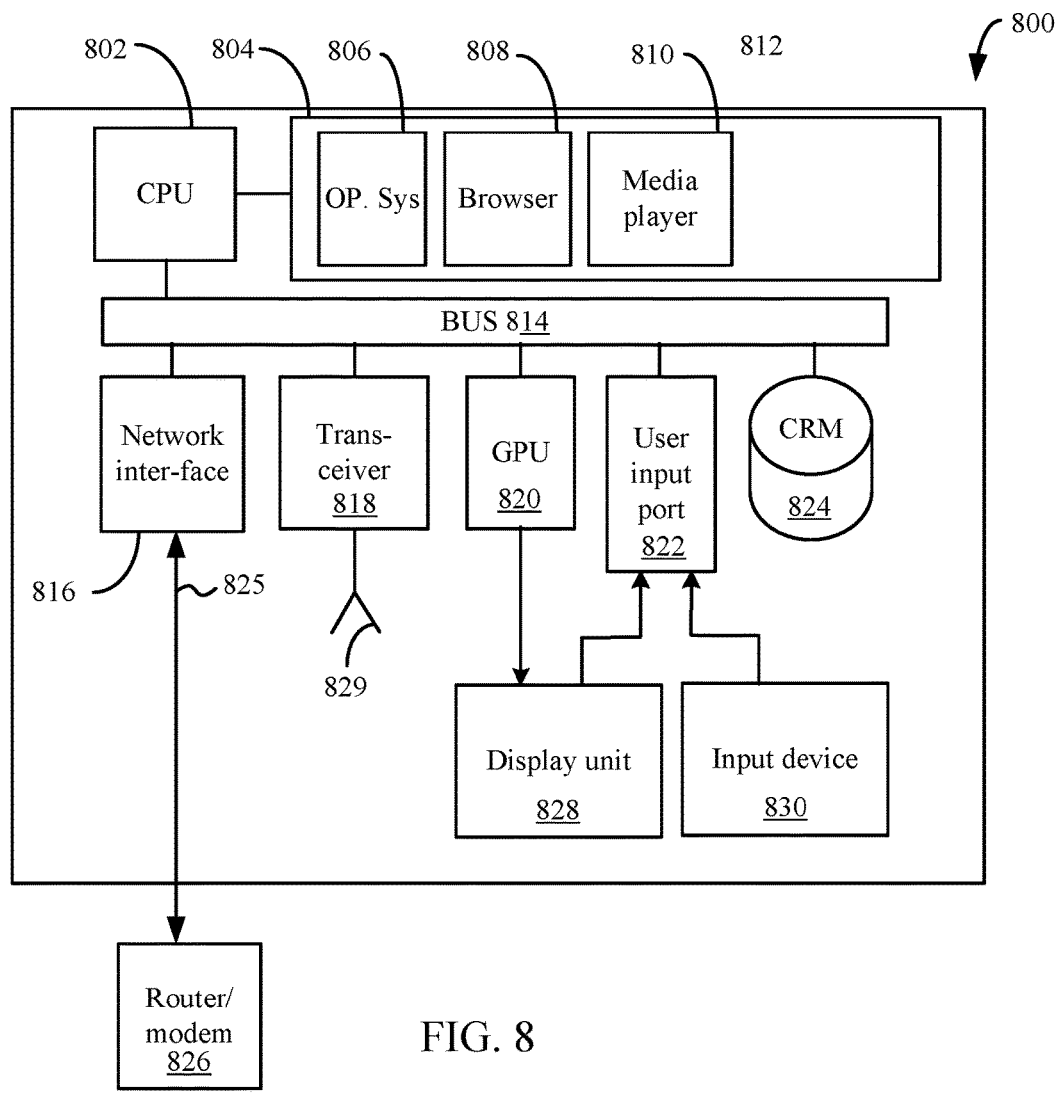
FIG. 8 depicts a diagrammatic view of an apparatus for viewing video content and advertisements.

Referring to FIG. 8, a diagrammatic view of an apparatus 800 for viewing video content and advertisements is illustrated. In selected embodiments, the apparatus 800 may include a processor (CPU) 802 operatively coupled to a processor memory 804, which holds binary-coded functional modules for execution by the processor 802. Such functional modules may include an operating system 806 for handling system functions such as input/output and memory access, a browser 808 to display web pages, and media player 810 for playing video. The memory 804 may hold additional modules not shown in FIG. 8, for example modules for performing other operations described elsewhere herein.

A bus 814 or other communication component may support communication of information within the apparatus 800. The processor 802 may be a specialized or dedicated microprocessor configured to perform particular tasks in accordance with the features and aspects disclosed herein by executing machine-readable software code defining the particular tasks. Processor memory 804 (e.g., random access memory (RAM) or other dynamic storage device) may be connected to the bus 814 or directly to the processor 802, and store information and instructions to be executed by a processor 802. The memory 804 may also store temporary variables or other intermediate information during execution of such instructions.

A computer-readable medium (CRM) in a storage device 824 may be connected to the bus 814 and store static information and instructions for the processor 802; for example, the storage device (CRM) 824 may store the modules 806, 808, and 810 when the apparatus 800 is powered off, from which the modules may be loaded into the processor memory 804 when the apparatus 800 is powered up. The storage device 824 may include a non-transitory computer-readable storage medium holding information, instructions, or some combination thereof, for example instructions that when executed by the processor 802, cause the apparatus 800 to be configured to perform one or more operations of a method as described herein.

A communication interface 816 may also be connected to the bus 814. The communication interface 816 may provide or support two-way data communication between the apparatus 800 and one or more external devices, e.g., the streaming system 800, optionally via a router/modem 826 and a wired or wireless connection. In the alternative, or in addition, the apparatus 800 may include a transceiver 818 connected to an antenna 829, through which the apparatus 800 may communicate wirelessly with a base station for a wireless communication system or with the router/modem 826. In the alternative, the apparatus 800 may communicate with a video streaming system 700 via a local area network, virtual private network, or other network. In another alternative, the apparatus 800 may be incorporated as a module or component of the system 700 and communicate with other components via the bus 814 or by some other modality.

The apparatus 800 may be connected (e.g., via the bus 814 and graphics processing unit 820) to a display unit 828. A display 828 may include any suitable configuration for displaying information to an operator of the apparatus 800. For example, a display 828 may include or utilize a liquid crystal display (LCD), touchscreen LCD (e.g., capacitive display), light emitting diode (LED) display, projector, or other display device to present information to a user of the apparatus 800 in a visual display.

One or more input devices 830 (e.g., an alphanumeric keyboard, microphone, keypad, remote controller, game controller, camera or camera array) may be connected to the bus 814 via a user input port 822 to communicate information and commands to the apparatus 800. In selected embodiments, an input device 830 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 828, for example using a touch sensitive screen. A cursor control device may communicate direction information and command selections to the processor 802 and control cursor movement on the display 828. A cursor control device may have two or more degrees of freedom, for example allowing the device to specify cursor positions in a plane or three-dimensional space.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:
    receiving, by a computing device, a request for a channel offered by a video delivery service from a user;
    generating, by the computing device, user information for the user;
    in response to receiving the request, sending, by the computing device, a query to a database to retrieve a bundle that includes an audience definition that matches the user information, wherein a bundle identifies a source stream for a program and only one bundle for a time slot is returned for the query from multiple bundles for the channel that exist for the time slot;
    constructing, by the computing device, a manifest for the channel using the returned bundle, the manifest identifying content from the source stream of the bundle; and
    providing, by the computing device, portions of the manifest to a client device for the user to allow the client device to request content from the source stream for the channel.

2. The method of claim 1, further comprising:
    receiving information describing programs for the channel over multiple time slots, wherein the programs are included in multiple source streams;
    generating audience definitions for each of the programs that define parameters for selecting a respective source stream for delivery to users; and
    storing a bundle for each audience definition in the database, wherein the bundle identifies the source stream and the respective audience definition.

3. The method of claim 1, wherein the user information is based on a current status of the user.

4. The method of claim 1, wherein the user information includes a device the user is currently using and a location of the device.

5. The method of claim 1, further comprising:
    receiving a plurality of source streams; and
    sending the plurality of source streams to a set of content delivery networks, wherein the set of content delivery networks stores the source streams, and wherein the plurality of source streams correspond to the multiple bundles for the channel for the time slot.

6. The method of claim 5, wherein:
    a first content delivery network stores a first source stream and not a second source stream, and
    a second content delivery network stores the second source stream and not the first source stream.

7. The method of claim 6, wherein:

the program comprises a first program and the time slot comprises a first time slot, a schedule for the channel includes the first program from the first source stream at the first time slot and a second program from the second source stream at a second time slot, and the manifest includes one or more links to request one or more segments of the first program from the first source stream stored at the first content delivery network in the first time slot and one or more links to request one or more segments of the second program from the second source stream stored at the second content delivery network in the second time slot.

8. The method of claim 7, wherein the client device does not request to switch from the first source stream to the second source stream.

9. The method of claim 7, wherein the first program and the second program form part of a linear stream for the channel.

10. The method of claim 5, wherein only one instance of each of the plurality of source streams is stored in the set of content delivery networks.

11. The method of claim 1, wherein:

the audience definition includes first set of characteristics for a potential user that will be eligible to request the program, the user information includes a second set of characteristics for the user, and the bundle is retrieved for the query when the first set of characteristics of the audience definition matches the second set of characteristics for the user.

12. The method of claim 1, wherein querying the database comprises:

comparing the user information with a plurality of audience definitions for the multiple bundles; and retrieving the bundle, including the audience definition that matches the user information.

13. An apparatus comprising:

one or more computer processors; and a non-transitory computer-readable storage medium comprising instructions, that when executed, control the one or more computer processors to be configured for:

receiving a request for a channel offered by a video delivery service from a user;

generating user information for the user;

in response to receiving the request, sending a query to a database to retrieve a bundle that includes an audience definition that matches the user information, wherein a bundle identifies a source stream for a program and only one bundle for a time slot is returned for the query from multiple bundles for the channel that exist for the time slot;

constructing a manifest for the channel using the returned bundle, the manifest identifying content from the source stream of the bundle; and providing portions of the manifest to a client device for the user to allow the client device to request content from the source stream for the channel.

14. The apparatus of claim 13, further configured for:

receiving information describing programs for the channel over multiple time slots, wherein the programs are included in multiple source streams;

generating audience definitions for each of the programs that defines parameters for selecting a respective source stream for delivery to users; and storing a bundle for each audience definition in the database, wherein the bundle identifies the source stream and the respective audience definition.

15. The apparatus of claim 13, wherein:

the audience definition includes first set of characteristics for a potential user that will be eligible to request the program, the user information includes a second set of characteristics for the user, and the bundle is retrieved for the query when the first set of characteristics of the audience definition matches the second set of characteristics for the user.

16. A method comprising:

receiving, by a computing device, information describing programs for a channel over multiple time slots, wherein the programs are included in multiple source streams;

generating, by the computing device, audience definitions for each of the programs defining parameters for selecting a respective source stream for delivery to a user;

storing, by the computing device, a bundle for each audience definition, wherein the bundle identifies the source stream and the respective audience definition;

receiving, by the computing device, a query that includes user information for a user;

retrieving, by the computing device, a bundle that includes an audience definition that matches the user information, wherein the bundle identifies a source stream for a program and only one bundle for a time slot is retrieved for the query from multiple bundles for the channel that exist for the time slot; and returning, by the computing device, the bundle, wherein the bundle is used to construct a manifest for the channel to allow the client device to request content from the channel.

17. The method of claim 16, wherein receiving the information describing the programs comprises:

receiving out-of-band information from sources listing information about the channel and programs offered by the channel in the multiple time slots.

18. The method of claim 17, wherein receiving the information describing the programs comprises:

receiving in-band information from a source stream that is being received from a content provider.

19. The method of claim 17, wherein:

the audience definition includes first set of characteristics for a potential user that will be eligible to request the program, the user information includes a second set of characteristics for the user, and a bundle is retrieved for the query when the first set of characteristics of the audience definition matches the second set of characteristics for the user.

20. The method of claim 17, wherein retrieving the bundle comprises:

comparing the user information with a plurality of audience definitions for the multiple bundles; and retrieving the bundle that includes the audience definition that matches the user information.

* * * * *